(12) United States Patent
Jecker

(10) Patent No.: US 7,685,691 B2
(45) Date of Patent: *Mar. 30, 2010

(54) METHOD OF CASTING A CONCRETE-MIX COUNTERTOP

(76) Inventor: Matthew X. Jecker, 6252 S. Philmar, Springfield, MO (US) 65804

( * ) Notice: Subject to any disclaimer, the term of this patent is extended or adjusted under 35 U.S.C. 154(b) by 209 days.

This patent is subject to a terminal disclaimer.

(21) Appl. No.: 11/801,159

(22) Filed: May 9, 2007

(65) Prior Publication Data

US 2007/0216052 A1 Sep. 20, 2007

Related U.S. Application Data

(63) Continuation of application No. 10/823,406, filed on Apr. 13, 2004, now Pat. No. 7,219,409, which is a continuation of application No. 10/823,409, filed on Apr. 12, 2004, now abandoned.

(60) Provisional application No. 60/462,051, filed on Apr. 11, 2003.

(51) Int. Cl.
 *B23P 25/00* (2006.01)
 *B28B 1/14* (2006.01)
(52) U.S. Cl. ............... 29/423; 29/458; 29/527.1; 52/742.14; 312/140.3
(58) Field of Classification Search ............ 29/401.1, 29/402.01, 402.04, 402.05, 402.08, 402.09, 29/402.18, 402.21, 423, 424, 458, 527.1, 29/527.2, 527.3, 530; 52/782.2, 742.14, 52/745.19; 312/137, 140.1, 140.3, 140.4; 428/542.8, 543; 264/239, 299, 337, 338
See application file for complete search history.

(56) References Cited

U.S. PATENT DOCUMENTS

| 3,646,181 | A | 2/1972 | Galla ..................... 264/73 |
| 5,260,007 | A | 11/1993 | Efstratis et al. ............ 264/35 |
| 5,546,708 | A | 8/1996 | Efstratis et al. ............ 52/36.2 |
| 6,978,529 | B1 | 12/2005 | Pearse .................. 29/402.08 |
| 7,219,409 | B2 * | 5/2007 | Jecker .................. 29/402.01 |

OTHER PUBLICATIONS

Rex Alexander. "Poured-in-Place Concrete Countertops." *Fine Homebuilding*, Aug./Sep. 1999. pp. 62-69.

* cited by examiner

*Primary Examiner*—Jermie E Cozart
(74) *Attorney, Agent, or Firm*—Jonathan Bay

(57) ABSTRACT

A method of producing a countertop upon a workspace furnishing such as floor cabinets by casting a polymer-modified cementitious casting compound thereupon has some of the following steps. Given the workspace furnishing, temporarily attaching edging forms or flow checks around all the free edges of the top deck thereof, both of which the forms the and flow checks operate to check the flow of the casting compound at least to the height of a given rise. Following that, pouring a polymer-modified cementitious casting compound over the countertop to the height of the given rise and as checked within the edging forms and flow checks. The edging forms have depending-flange relief cavities that descend below the plane of the deck that give the hardened casting compound an appearance of a virtual thickness that disguises in part the actual thinness of the rise over the deck.

6 Claims, 10 Drawing Sheets

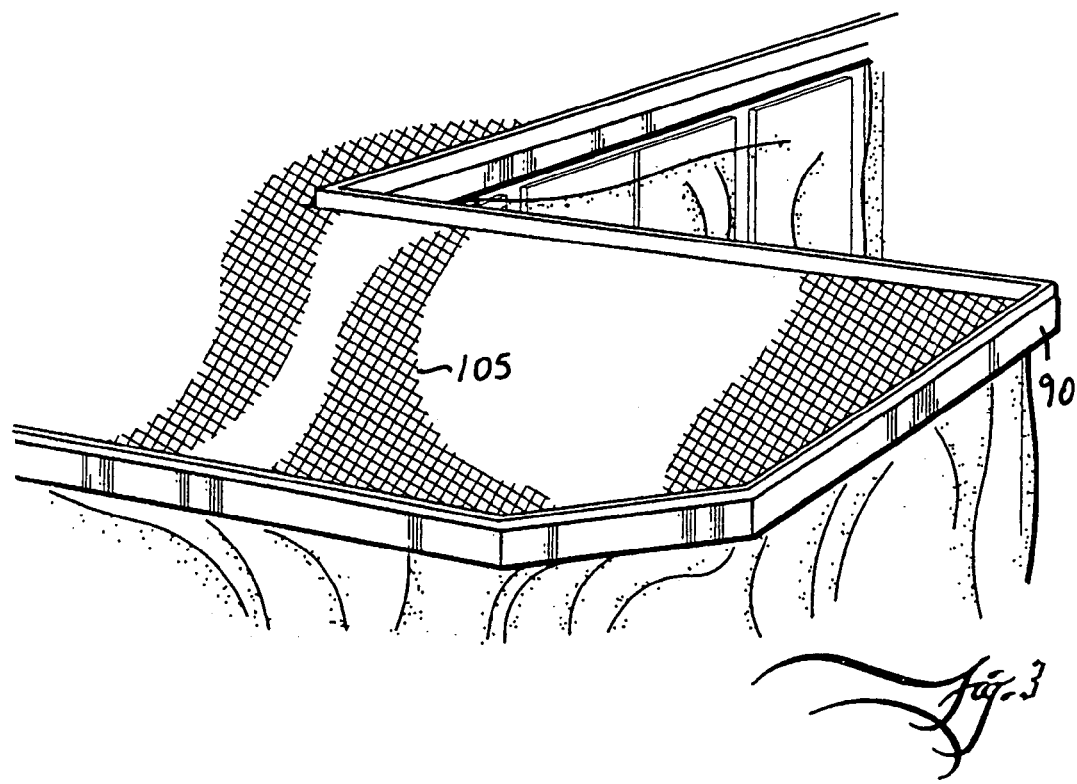
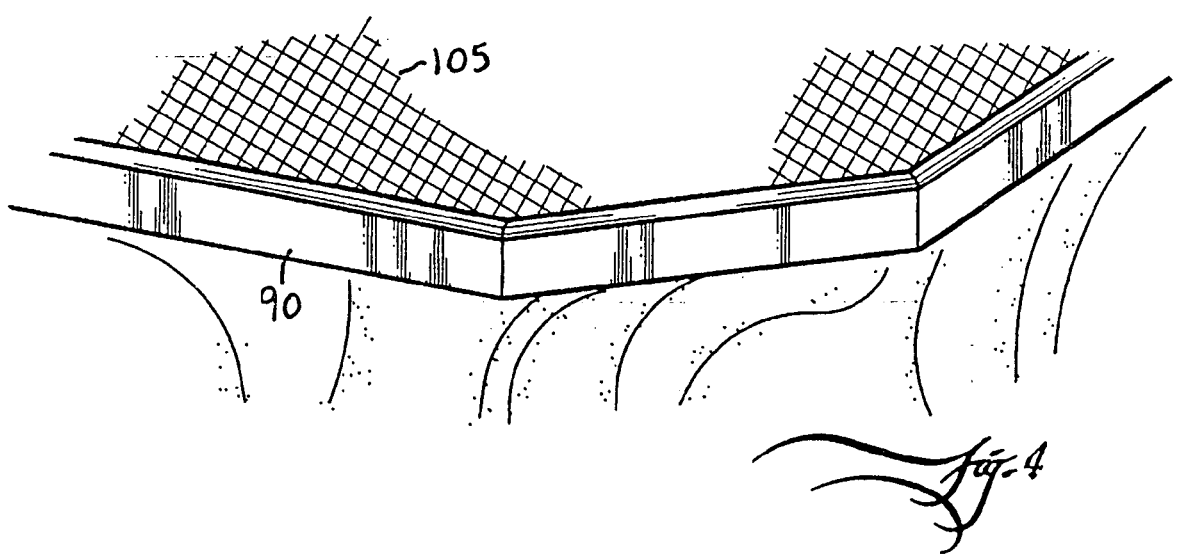

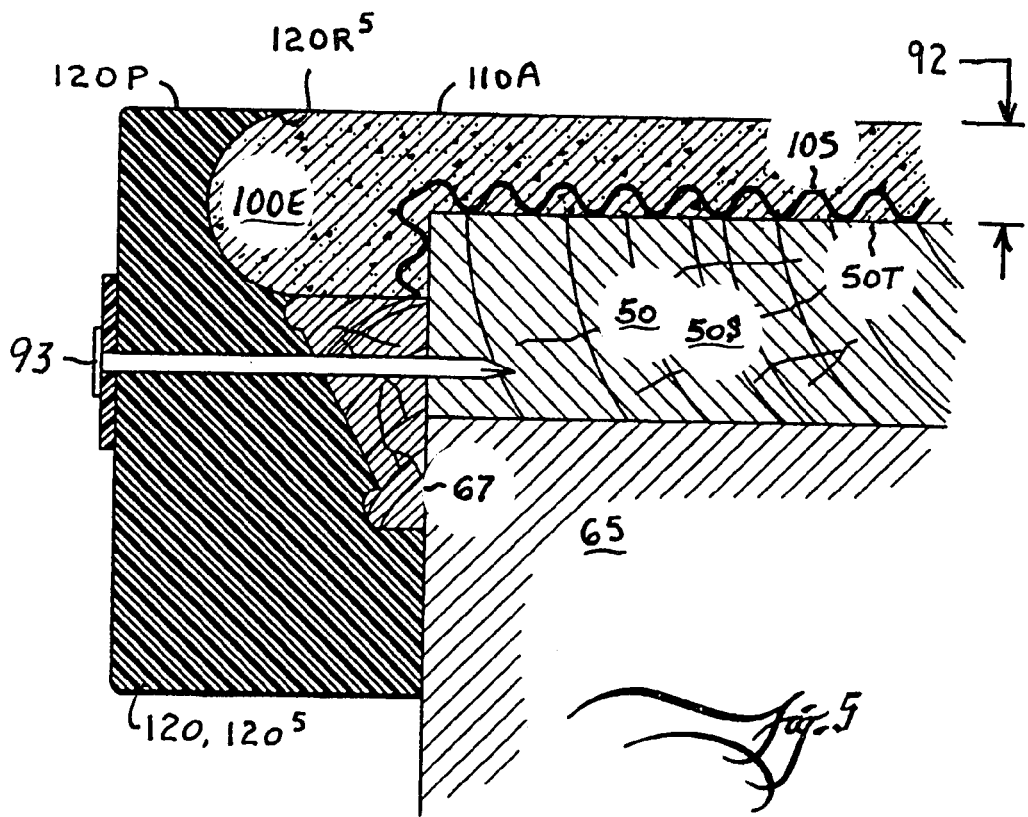
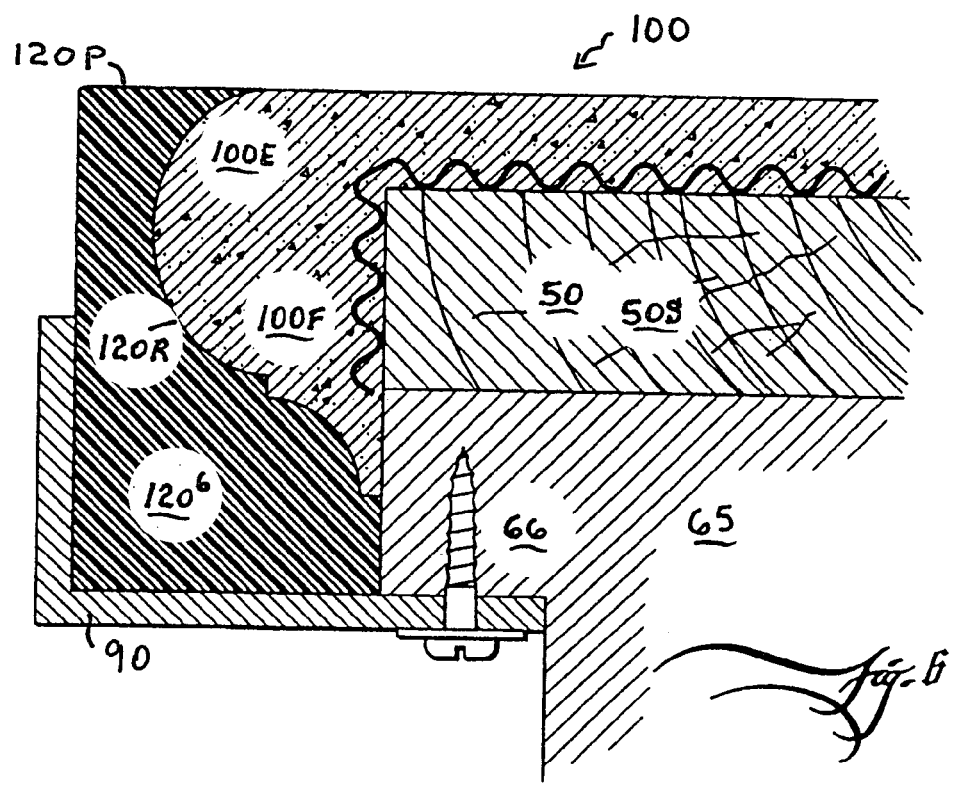

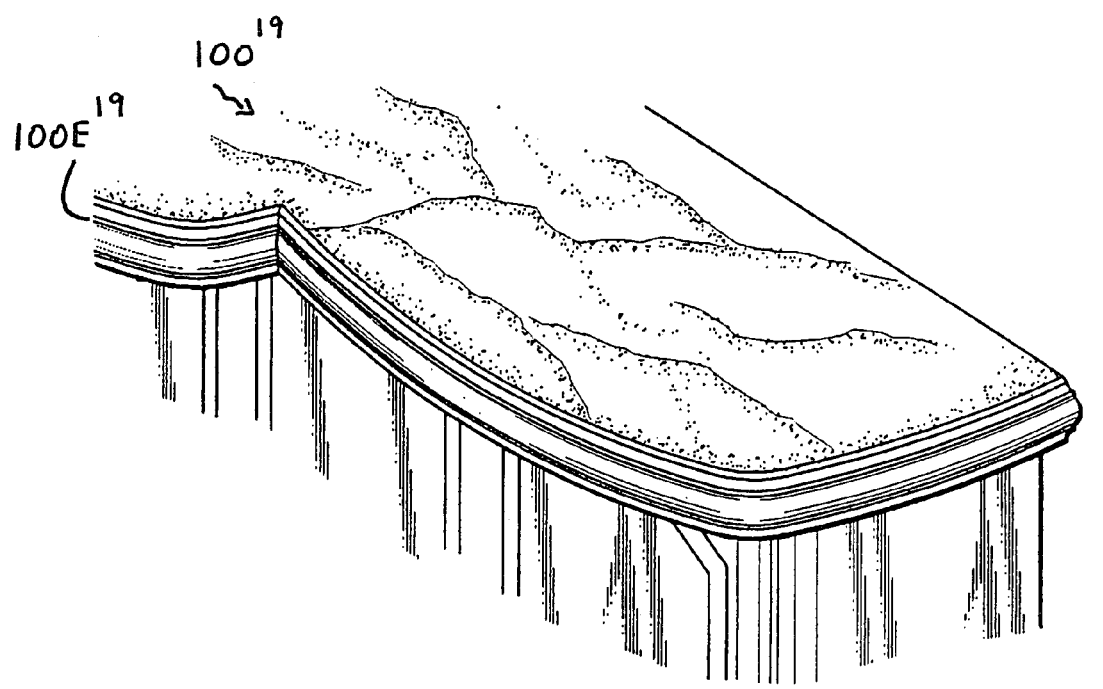
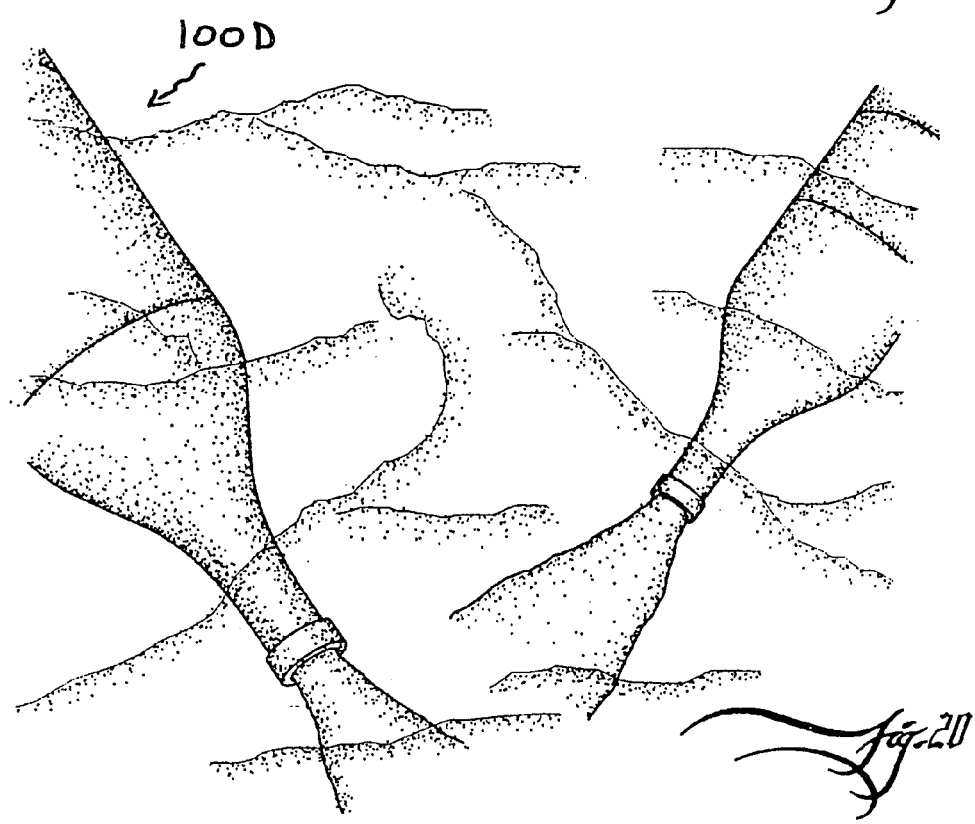

METHOD OF CASTING A CONCRETE-MIX COUNTERTOP

CROSS-REFERENCE TO RELATED APPLICATION(S)

This application is a continuation of U.S. patent application Ser. No. 10/823,406, filed Apr. 13, 2004, now U.S. Pat. No. 7,219,409 B2 which is a continuation of U.S. patent application Ser. No. 10/823,409, filed Apr. 12, 2004, now abandoned which claims the benefit of U.S. Provisional Application No. 60/462,051, filed Apr. 11, 2003, all of which are incorporated herein by reference.

BACKGROUND OF THE INVENTION

1. Field of the Invention

The invention relates to countertop production and then also the resultant countertop as a product.

2. Prior Art

The following discussion considers the counter and/or countertop production from the context of remodeling jobs. This is done so not for limiting the invention but for convenience only in this discussion because the inventor's experience is predominantly in this context. However, the issues discussed below apply comparably to new construction as well.

That said, a homeowner's remodeling options from the prior art have to date included FORMICA®, CORIAN®, tile, marble, granite and chemically-stained concrete.

FORMICA® is the lowest cost option, partly because countertops are simply resurfaced rather than having the counter totally refurbished. In that fashion, FORMICA® is simply used to cover over the original countertop, which of course eliminates the work of tearing out the counter. The shortcomings of FORMICA® include its vulnerability to being marked by scratches as well as burns. Also, FORMICA® does not really achieve a high-end classic look.

CORIAN® is an improvement over FORMICA® toward achieving a high-end decorative look, but as can be expected, it is costlier because of that. Typically a remodeling job with CORIAN® requires tearing off and junking the original counter, which includes tearing off the wood or MDF (or whatever) substrate. CORIAN® has to be ordered according to measurements taken on the job-site, and then produced in slabs at fabrication sites remote from the job-site, not deliverable to the job-site until factory-ready. Only then, after delivery, can the CORIAN® slabs be installed. During remodeling jobs, homeowners may have to wait weeks after the pre-existing counter is torn down and measurements are taken before the job can be completed, all because of waiting on delivery from the factory. Since CORIAN® slabs are set in tile fashion next to one another, there are consequently seams. Typically seams between CORIAN® slabs are grouted or caulked. CORIAN® generally lasts better than FORMICA® because it is not as vulnerable to being marked by scratches or burns. Nevertheless, the grouted seams between CORIAN® slabs have to be properly sealed and perhaps re-sealed, and even then cared for and looked after as time extends.

Tile has all kinds of inherent issues involved with it. A remodeling job requires tearing off all the original counter, which includes its substrate, because the substrate has to be replaced with a fresh and clean, hardy backer-board for supporting the tile. Hence, the workers or installers have to tear out the original counter, build a new substrate, trowel on a thin undercoat, lay in the tile pieces, and then let things dry. After drying, the seams are grouted, let dry, sealed, let dry, re-sealed and then perhaps the job is done. The tile look has had and likely always will have its ardent fans. Nevertheless, common shortcomings with aging tile counters include shrinkage of grout in one seam or another (of the usually quite extensive interlaced network of such seams), or else the wiggling loose of a lone piece of tile in its socket, it somehow (as is commonplace over time) having loosened free from its undercoat and grout anchorage.

Marble and granite produce a look for counters that can flat out awe and amaze, yet as expected there is a corresponding cost for that. Replacement jobs with marble and granite follow a fairly similar procedure as with CORIAN®. Briefly, the procedure is messy and slow. The homeowner not able to live in all of the kitchen for at least a week. Again, the pre-existing counter has to be torn out, measurements have to be taken at the job-site, then slabs have to be ordered from remote shops where the slabs are sized and finished. The pre-existing counter is usually torn off right down to the cabinet top, which includes tearing off the substrate. From the time the tear-off job starts and until the job is completed, the whole remodeling job can take a week or two. The slabs have to be received at the site, installed, the seams have to be grouted or otherwise caulked. And then the slabs-and-seams have to be sealed and re-sealed. Although the public is more widely informed about this as a shortcoming of marble's, it is news to many that granite can be marred by scratches or stains. Hence granite and marble alike require some delicacy in use and periodic re-application of sealant over time.

In addition to all the above options, the prior art includes concrete counter/countertops. There are two significantly different approaches for doing a concrete job. One approach involves pouring the concrete in-place, typically right on top of the pre-existing countertop. Workers build low dams around the edges. Concrete for the pour is mixed in a wheelbarrow or else brought in by a truck that backs up to a window to pump it in. Either way, concrete is poured onto the dammed up counter. Indeed, since concrete is typically poured in to a depth at minimum of about two inches (~5 cm), it often makes sense to have a truck brought to the job-site and pump it in from there.

Generally a homeowner would desire the concrete countertop to be seamless, but experienced contractors sometimes put in seams to break up certain expansive spreads because otherwise shrinkage during drying will cause cracks. The concrete is allowed to harden part way to full cure (i.e., about a day or two) before workers grout seams. The homeowner is asked to live lightly in the kitchen during the month (i.e., twenty-eight days) it takes for the concrete to reach full cure. That is, the homeowner is advised not to spill out juice or grease—or anything stain-causing—onto the curing concrete. Only after full cure is it prudent to start grinding and polishing radiuses, in fact polishing over the whole pour. Then after that detail work is completed, the workers can at that time undertake the steps of stain, seal and re-seal and so on until done.

For all the all time and trouble (and mess), concrete countertops are capable of being rendered into truly awesome and attention-stopping structures. They are also, however, massive. They look like, and are, relatively thick slabs of concrete rendered as counters.

In contrast to the foregoing, the significantly different other approach to doing a concrete counter involves pouring concrete slabs at remote sites and then, after the month long cure (as well as staining and sealing process), delivering the slabs to the site for final installation. At some original time, workers tear out the pre-existing counter, take measurements for the concrete-slab replacement, return to their remote shop and build molds for the separate slabs. Concrete is then poured into the molds and allowed to cure. After curing, the separate slabs are extracted and flipped over from their top-side-down orientation in the molds, and then polished, stained, sealed and re-sealed and so on, in the shop. Ultimately the completed slabs are delivered to the job-site, laid in-place, and grouted together to fill in the seams between the separate slabs.

By either approach to doing concrete jobs, homeowners typically face a month long ordeal during which their kitchen is substantially knocked out of service. In spite of that, many do put up with the inconvenience of mess and time because as said, concrete counters can be admired as awesome. For better or worse, concrete counters are massive things too.

What is needed is an improvement which overcomes various shortcomings of the various prior art options.

SUMMARY OF THE INVENTION

It is an object of the invention to produce polymer-modified concrete countertop overlays so that practitioners of the inventive method can pour in a casting compound of such in a very thin pour, rather than in the fashion of the massive concrete-slab counters of the prior art.

It is another object of the invention that the foregoing thinly-poured polymer-modified countertop overlays provide excellent flexural strength compared to prior art concrete-slab countertops, as well as cure in a fraction of the time normally required for straight concrete.

It is an additional object of the invention to provide edging forms for giving shape to the edges of the polymer-modified concrete countertop overlays, which because of the thin pour of such, the inventive overlays can consequently be compact, lightweight, easily shaped by profile-shaping machine, deformable for coursing along not just straight lines but gentle curves too, whereby the total appearance of the end-product countertop overlay is not massive as the prior art knows in connection with straight concrete overlays, but lightweight, classic.

It is a further object of the invention to improve the way in which the stain and seal coats are applied in order to achieve and lock-in one-of-a-kind looks.

It is an alternate object of the invention that the remodeling jobs for producing the foregoing enhanced countertops can usually be completed in four to five days. In fact, with remodeling jobs that start with FORMICA® countertops among others, the inventive polymer-modified concrete countertop overlay can be applied directly on top of the FORMICA®.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIGS. 2 through 15 comprise a series views showing various steps or stages along the way of an example execution of the method in accordance with the invention for polymer-modified concrete countertop production, to obtain a concrete mix countertop overlay (or product) in accordance with the invention as shown by FIG. 16, wherein:

FIG. 2 is a perspective view comparable to FIG. 1 except showing a stage where inter alia the subsisting countertop has been overlain with lath;

FIG. 3 is an enlarged scale perspective view zooming in on the foreground in FIG. 2 and showing inter alia temporary attachment of sheet metal gutters for supporting temporary edging forms;

FIG. 4 is an enlarged scale perspective view zooming in on the foreground in FIG. 3 and showing inter alia the insertion of the temporary edging forms in the gutters;

FIG. 5 is a sectional elevational illustration showing a foam-block edging form in accordance with the invention and showing inter alia a nail and washer securing the edging form to the subsisting counter (or alternatively the underlying cabinet, although this is not shown), and as nailed through a fillet;

FIG. 6 sectional elevational illustration comparable to FIG. 5 except showing an alternate method of temporarily attaching the foam-block edging form in place, namely wherein, as introduced in FIGS. 3 and 4, the edging form is supported by a sheet metal gutter which in this view is secured by screws to the underside of an overhang of the subsisting cabinet (or alternatively, an overhang of the subsisting counter, although this is not shown);

FIG. 7 is an enlarged scale perspective view zooming in on the center of FIG. 2 and showing inter alia the opening that was left by the removal of the sink thereafter being rimmed by a temporarily-attached band of flexible material, forming a low flow check;

FIG. 8 is a perspective view comparable to FIG. 2 except showing inter alia the pouring in of a casting compound over the lath;

FIG. 9 is a perspective view comparable to FIG. 8 except showing inter alia the poured-in casting compound being troweled out to completely cover the subsisting countertop as well as fill in all the cavity provided by the edging forms;

FIG. 10 is a perspective view comparable to FIG. 1 except showing inter alia the poured-in casting compound leveled out even with the low rises of the edging forms and flow checks, respectively;

FIG. 11 is a perspective view comparable to FIG. 9 except showing inter alia a process for indenting a texture into the surface of the hardening, but still soft, casting compound;

FIG. 12 is a perspective view from a vantage point a quarter-turn contra-clockwise relative to FIG. 11, showing inter alia the continuation of the indenting process, including the matching of the "fault-lines" across seams to disguise any repetitious pattern of such;

FIG. 13 is a perspective view comparable to FIG. 12 except showing inter alia the edging forms and gutters removed from the work (concurrently, the flow checks would be removed as well although this is not shown);

FIG. 14 is a perspective view comparable to FIG. 13 except diagrammatically showing inter alia application of sealant, or else a mixture of sealant and stain such that two jobs can be accomplished by one;

FIG. 15 is a perspective view comparable to FIG. 14 except showing inter alia that the remodeling job is primarily done, in as much as that the protective plastic film and drop cloths can be removed at this time;

FIG. 19 is an enlarged scale side perspective view of the bar top of FIG. 18; and FIG. 20 is another perspective view of a polymer-modified concrete countertop product in accordance with the invention except showing that the creative embellishments the invention affords are not just limited to texture and color but also allow fanciful and arbitrary designs as well.

DETAILED DESCRIPTION OF THE PREFERRED EMBODIMENTS

Figure 1:
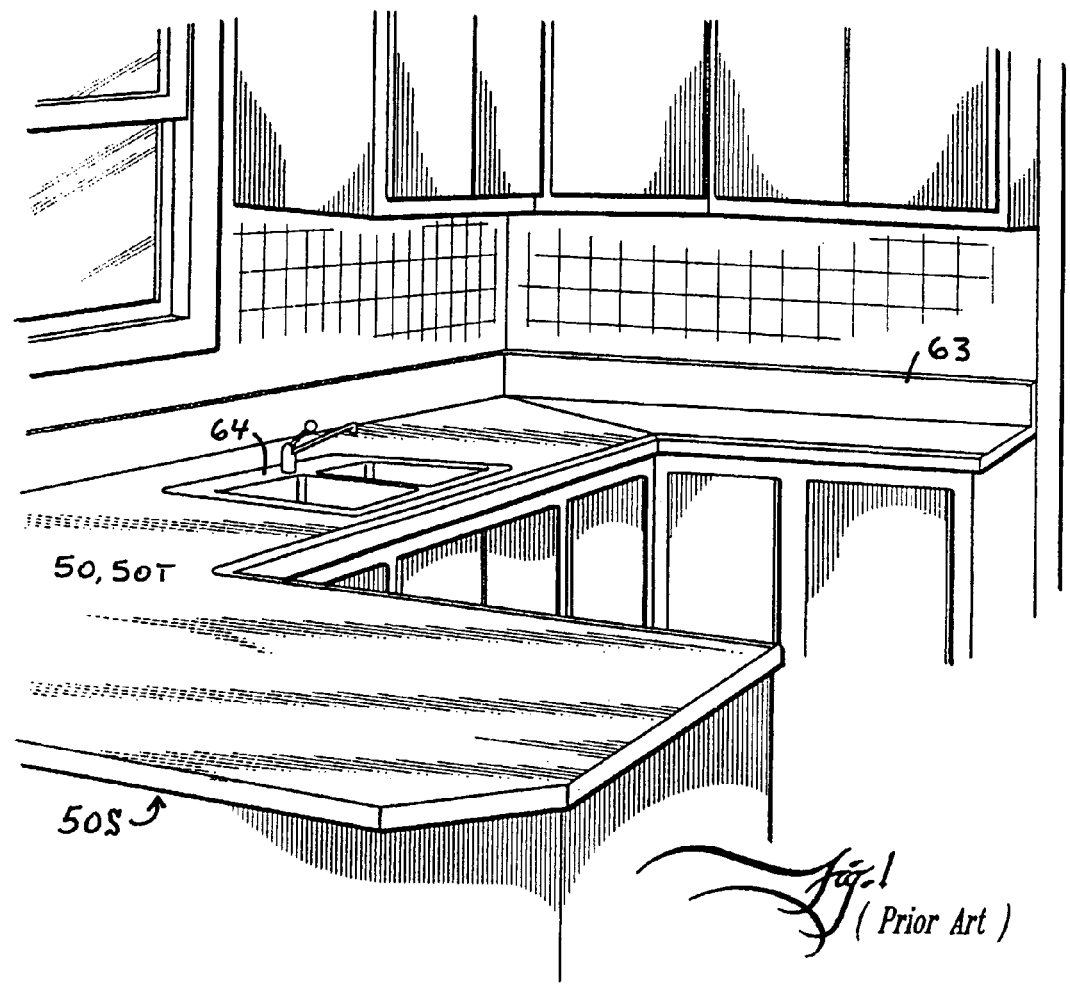
FIG. 1 is a perspective view of a prior art or subsisting kitchen countertop before which remodeling work is undertaken to it by practitioners of a method of producing polymer-modified concrete countertops in accordance with the invention, to obtain a polymer-modified concrete countertop product or overlay in accordance with the invention.

FIG. 1 shows a prior art kitchen counter 50 at some original time before a remodeling job on it is undertaken by practitioners of a polymer-modified concrete countertop production method in accordance with the invention. For sake of a non-limiting example, this prior art counter 50 has a countertop covering of FORMICA® 50T and serves as a representative of a prevalent type of counter 50 popularly chosen for a remodeling enhancement.

The kitchen counter 50 shown in FIG. 1 serves as a non-limiting example of an exemplary kitchen or bar or else bathroom countertop suitable for enhancement by the method in accordance with the invention, it further serving as an example without exclusion of other residential and commercial building countertop-like structures suitable for enhancement by polymer-modified concrete countertop productions in accordance with the invention. One aspect of the invention is that the inventive casting process can be administered directly on top of a subsisting, pre-existing countertop 50T or substrate 50S, without requiring the subsisting countertop 50T or substrate 50S to be stripped down or torn off.

Whereas the advantages of the invention work advantageously on FORMICA® covered counters 50, it is not a prerequisite of the inventive method that the pre-existing counter 50 truly belong in a class of "prior art" counters. The method in accordance with the invention is suitably advantageous for administering to a wide variety of "subsisting" countertops 50T or substrates 50S, preferably ones which are particularly suitable for overlay by the inventive utilization of polymer-modified concrete/cementitious materials.

Figure 15:
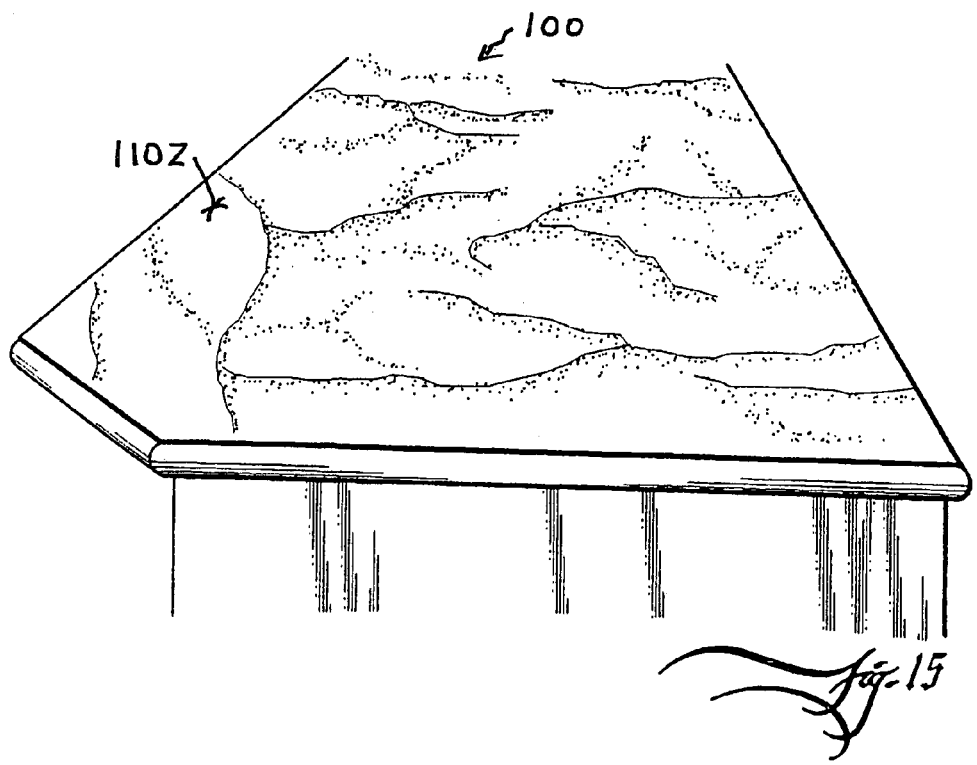
Figure 16:
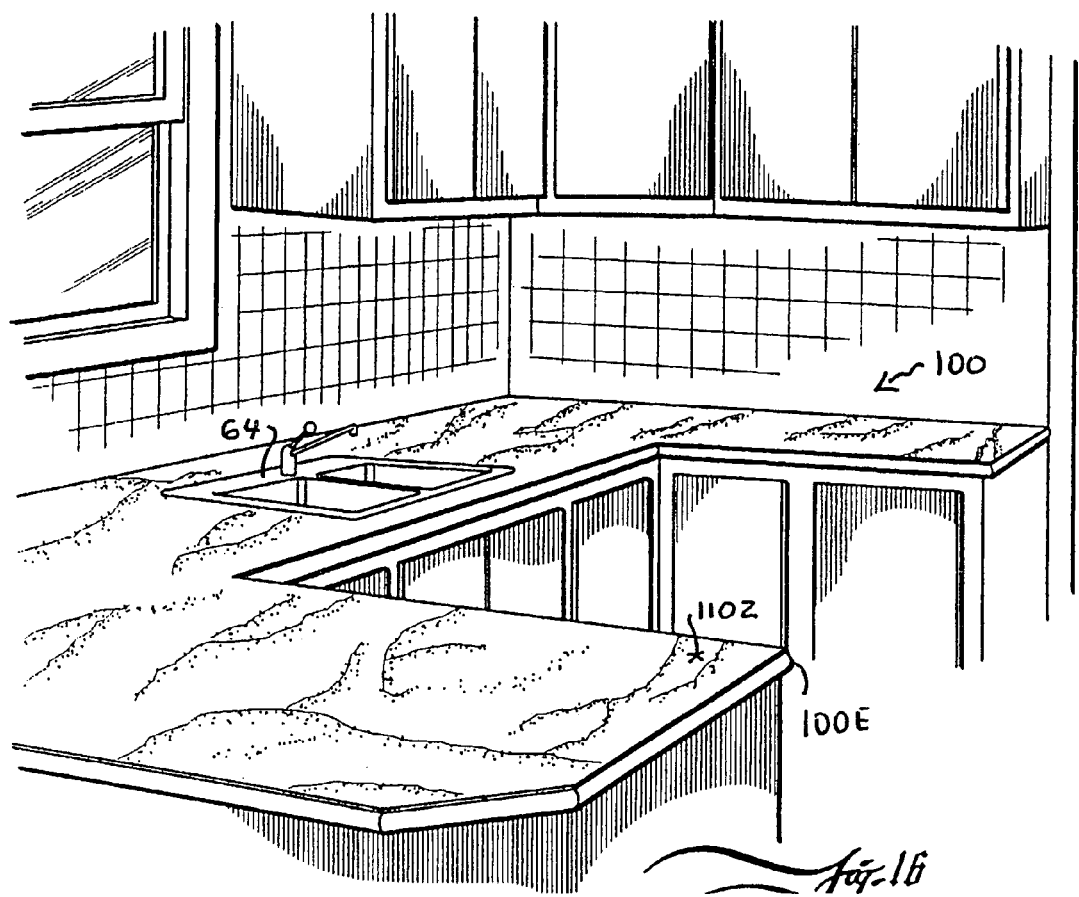
FIG. 16 is a perspective view comparable to FIG. 1 except showing in contrast the substantial completion of the remodeling job for installing the polymer-modified concrete countertop overlay in accordance with the invention, which substantially changes the look of the subsisting countertop shown in FIG. 1.
Figure 18:
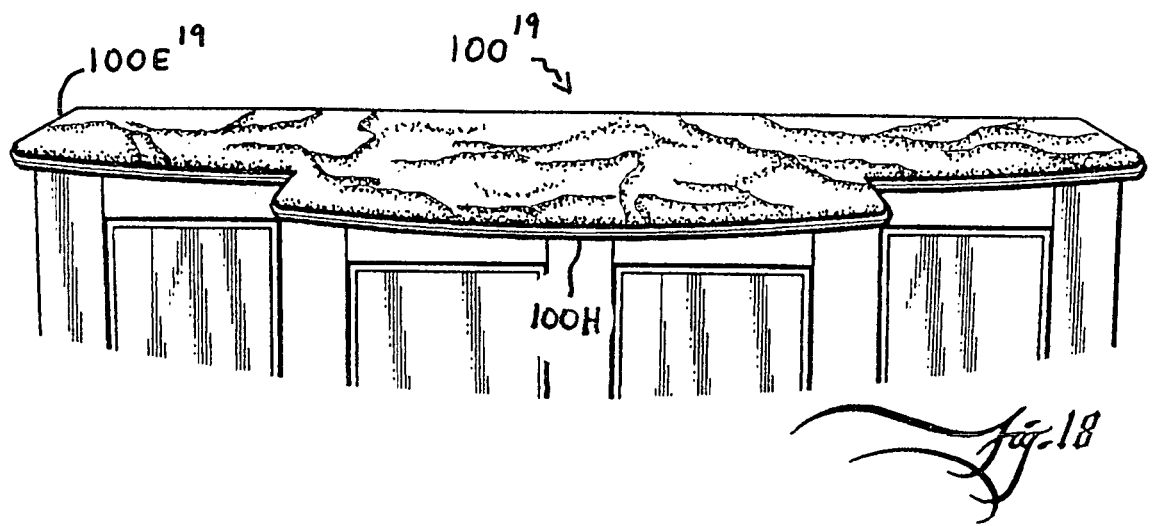
FIG. 18 is a front perspective view of an alternate embodiment of a polymer-modified concrete countertop product in accordance with the invention, and one which includes curving edges that in part were enabled by the edging-form support of FIG. 17.

FIGS. 2 through 15 provides a series of "snapshots" of various stages of completion of an example implementation of the method in accordance with the invention, for producing a polymer-modified concrete countertop product or overlay 100 in accordance with the invention as shown by for example and without limitation FIG. 16 or 18.

Figure 2:
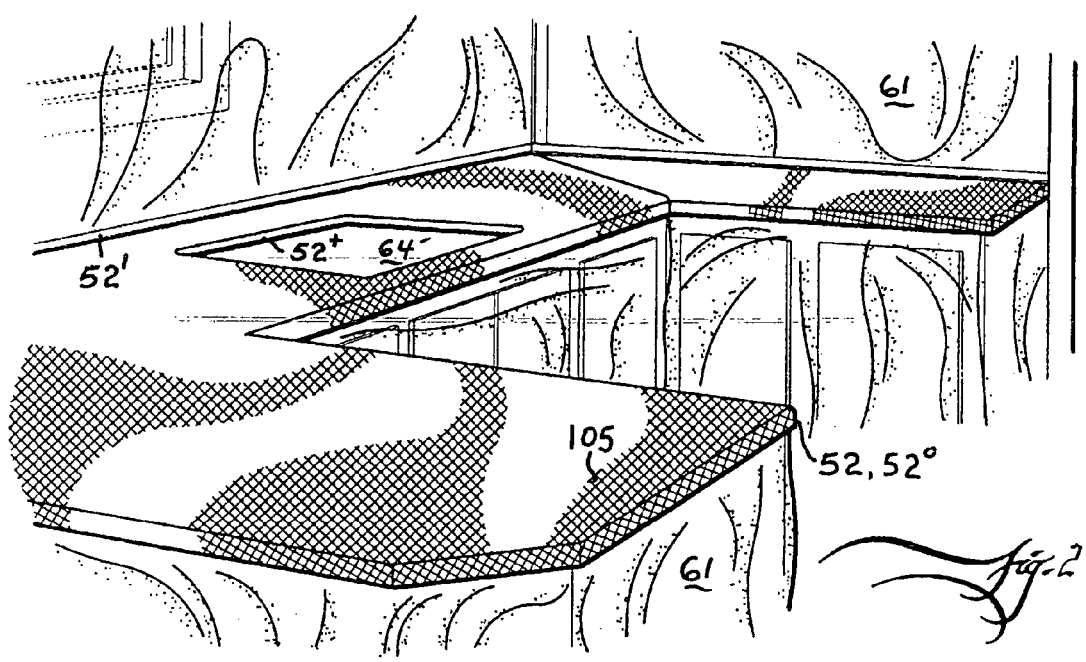

FIG. 2 shows preparation work in progress. The floor cabinets are covered with plastic film 61 to protect against splatter, as have the walls adjoining the subsisting countertop. The low "back-splash" 63 shown in FIG. 1 is removed (and preferably discarded instead of re-installed afterwards). The overhead cabinets might be temporarily taken down so that they too avoid splatter on during the job. Accessories likes sinks 64 and stoves and so on are temporarily removed or moved out of the way or protected by covering as well. Drop cloth is also preferably stretched out across the floor (not in view).

More significantly, the subsisting FORMICA® covering 50T as well as its underlying substrate (indicated as reference 50S in FIG. 5) are left in place. In fact, the subsisting FORMICA® covering 50T is utilized for purposes of the invention described more particularly next. The view shows that lath 105 is stretched out over the subsisting FORMICA® covering 50T. It is preferred if the lath 105 is either expanded or woven metal mesh. The lath 105 is cut and trimmed to size for a suitably good fit.

The countertop 50T can be reckoned as delimited by edges 52 falling into one of three or so categories. One category of edges includes those edges 52 [1] bounded by an adjoining, presently tangible vertical structure such as walls or backsplashes. Typically there is no need to check the flow of a casting compound at these edges. A second category of edges includes those edges 52+ bounded by an adjoining, presently intangible vertical constraint. One example of such is the opening 64' for the removed sink 64. Although the sink 64 itself is tangible, it is presently removed and so the constraint to not alter the size of its required opening 64' is a "presently intangible" constraint. Consequently, the flow of the casting compound typically must be checked from flowing across such a vertical constraint so that the compound will not, in this instance, shrink the size of the opening 64' so much so that re-installing the sink is a challenge. This category of "presently intangible" constraints also includes bays formed into the subsisting counter 50 (and underlying cabinetry) to allow the sliding-in of a closely fitting stove/oven appliance or the like, or else any other reason determined by the planners of the project.

A third category of edges, among other further categories not defined here, include those edges 52° that are essentially free of any such of the foregoing boundaries or constraints. This third category of edges 52° affords opportunity to construct the inventive countertop overlay 100 with decorative embellishments such as and without limitation edge profiles including protrusions 100E extending outboard from the subsisting counter 50's edge 52° as well including apron- or fascia-portions 100F. FIG. 2 shows that the lath 105 is folded down at these category three edges 52° for at least a short length thereof.

The lath 105 is attached simply by stapling it down, right through the FORMICA®. Typically it takes three to four hours on day one to complete this much work.

FIG. 3 shows installation of sheet metal angles 90 which will support edging forms (e.g., such as indicated 120[6] in FIG. 6). The sheet metal angles 90 might measure about 1-5/8 inches by 1-7/8 inches (~4 cm by ~5 cm) and are screwed temporarily to the bottom of the underlying cabinet 65's overhang 66 (if any, see e.g. FIG. 6). The sheet metal angles 90 serve as a temporary gutter. The edging forms 120[6] are slipped inside the gutters as shown better by FIG. 6.

FIG. 4 shows a enlarged scale view, relative to FIG. 3, of edging forms 120 that are slipped inside the gutters 90 in order to eventually provide the completed countertop product with a decorative edging.

FIG. 5 is a sectional illustration showing one edging form 120[5] in accordance with the invention. In this view, the casting compound 110A is already poured-in over the subsisting countertop 50T. Preferably the inventive edging form 120[5] is produced from an indefinitely long length of foam block- or bar-stock. Such foam bar-stock is preferably recessed in on one side to provide in relief 120R[5] an edging profile for the ultimate polymer-modified concrete countertop overlay 100. The relief profile 120R[5] may be formed in the foam bar-stock by any suitable means including without limitation a router operation or like edge-profiler.

The inventive edging form $120R^5$ is attached directly or indirectly to the subsisting counter 50 such that the edging form 120's outboard crown perimeter 120P protrudes above the plane of the subsisting countertop 50T by a given measure, or in other words, a given rise 92. The given rise 92 measures preferably equal to, but more preferably at least greater than, the thickness of the pour of the casting compound 110A as measured above the plane of the subsisting countertop 50T.

Foam material is preferred for the edging forms for several reasons. These include its adaptability to accept intricate reliefs 120R of edge profiles, its flexibility to produce gentle curves $100E^{19}$ in finished countertop overlays $100^{19}$ (see, e.g., FIG. 19), and its properties for releasing from cured polymer-modified concrete/cementitious materials.

FIG. 5 also shows nail and washer 93 securing the edging form $120^5$ to the subsisting counter 50 (or alternatively, but not preferred, the underlying cabinet 65, although this is not shown), as nailed in this particular illustration through a fillet 67. In this particular embodiment, the relief profile $120R^5$ in the edging form $120^5$ both defines the edge profile for the poured casting compound 110A as well as accommodates the fillet 67. Although the edging form $120^5$ is shown temporarily attached to the counter 50 by nail and washer 93, it is preferably not nailed to the underlying cabinet 65 so as not to leave a mark. It is preferred to produce the relief profiles 120R by edge-profiling machines in a shop off-site and then brought to the job-site on project day.

FIG. 6 is comparable to FIG. 5 except showing an alternate embodiment of an edging form $120^6$ in accordance with the invention. The inventive edging forms 120 are amenable to being shaped with about any relief profile 120R imaginable, especially relief profiles shaped-out by edge-profiling machines. The edging forms 120 are preferably used once and discarded. In FIG. 6, it is preferred if the edging form $120^6$ is supported by the sheet metal gutter 90 mentioned previously in connection with FIGS. 3 and 4. Completion through this phase of the project generally takes another two hours on day one.

Figure 7:
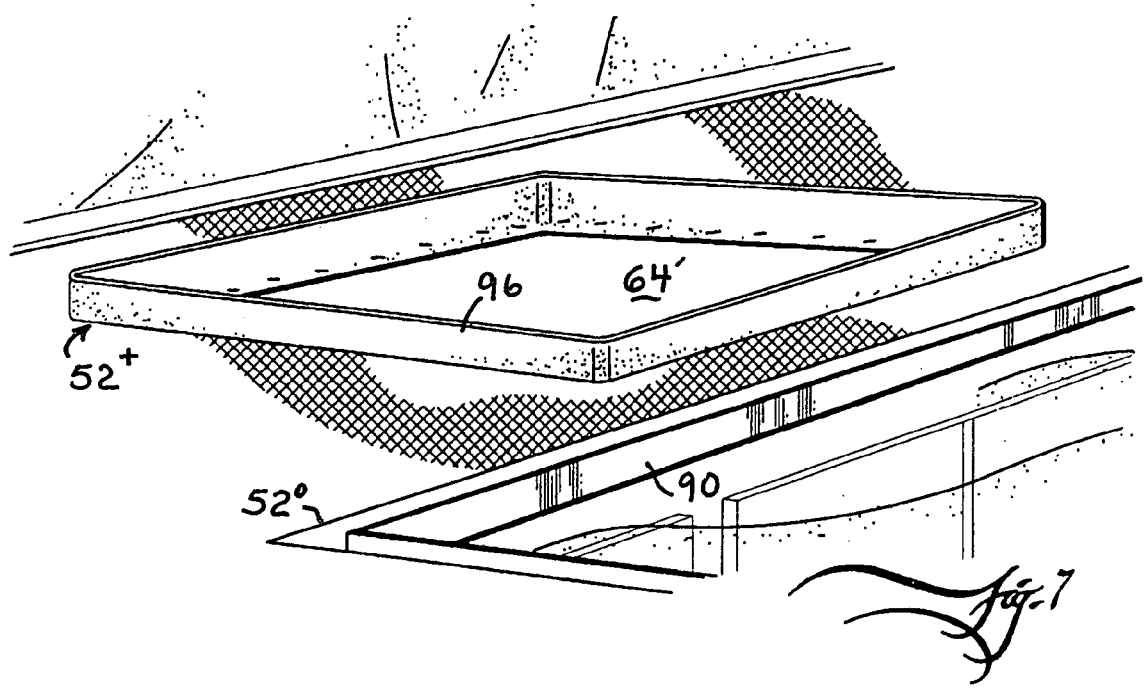

FIG. 7 shows the following in connection with that category of edges 52 for the subsisting counter 50 that encompass "presently intangible" vertical constraints (e.g., edges $52^+$ in the "second" category, and in this view, surrounding the opening 64' for the removed sink 64). That is, such edges 52 are preferably rimmed by a temporarily-attached band of flexible plastic 96, which forms a flow check. That is, the flow of the casting compound 110A must be checked from spilling over the edge of the sink opening 64' so that the casting compound 110A will not, in this instance, shrink the size of the opening 64' so that the sink 64 cannot be comfortably re-installed. The flexible flow-check band 96 is preferably attached temporarily by brads, nails, staples or the like. The flow check 96 is arranged to protrude above the plane of the subsisting countertop 50T by a given rise (e.g., compare 92 in FIG. 5) that measures (like the case with the edging forms 120) preferably equal to, but more preferably at least greater than, the thickness of the pour of the casting compound 110A as measured above the plane of the subsisting countertop 50T. This completes day one on the job. Pause can be taken because everything is prepared for the pour of the casting compound 110A.

Figure 8:
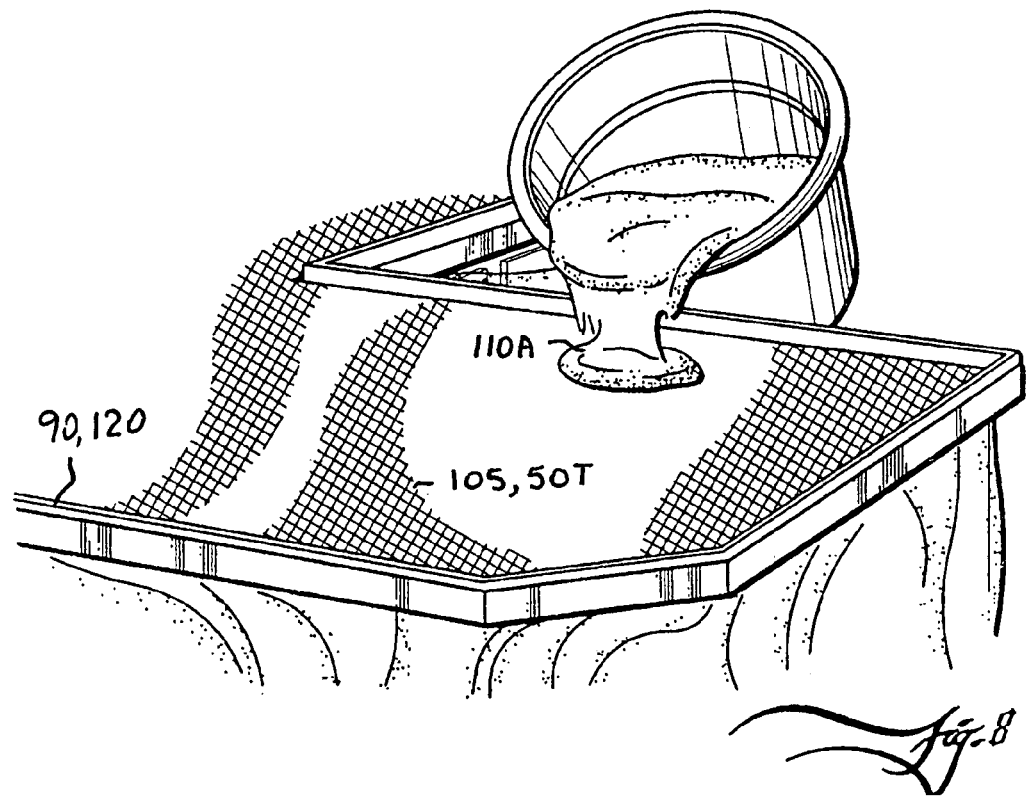

FIG. 8 begins what preferably is day two of the project. The preferred casting compound 110A comprises a polymer-modified cementitious material that hardens into polymer-modified concrete. Suitable sources for the starting materials for polymer-modified cementitious casting compounds include without limitation Americrete of Temecula, Calif.; Color Maker Floors LTD of Burnaby, B.C., Canada; Increte Systems of Odessa, Fla.; The Quickrete Company of Atlanta, Ga.; Super Stone, Inc., of Opa Locka, Fla.; Surecrete Design Products, Inc, of Dade City, Fla.; as well as Ultimate Concrete Resurfacing Systems, Inc., of Naples, Fla.

These sources offer both containerized wet mixes for use fairly immediately upon opening as well as dry mixes which are to be combined with something, e.g., water, to change them over into wet mixes suitable for pouring as a casting compound. In FIG. 8, a batch container of the casting compound 110A is being poured in onto the lath/subsisting countertop 105/50T.

Figure 9:
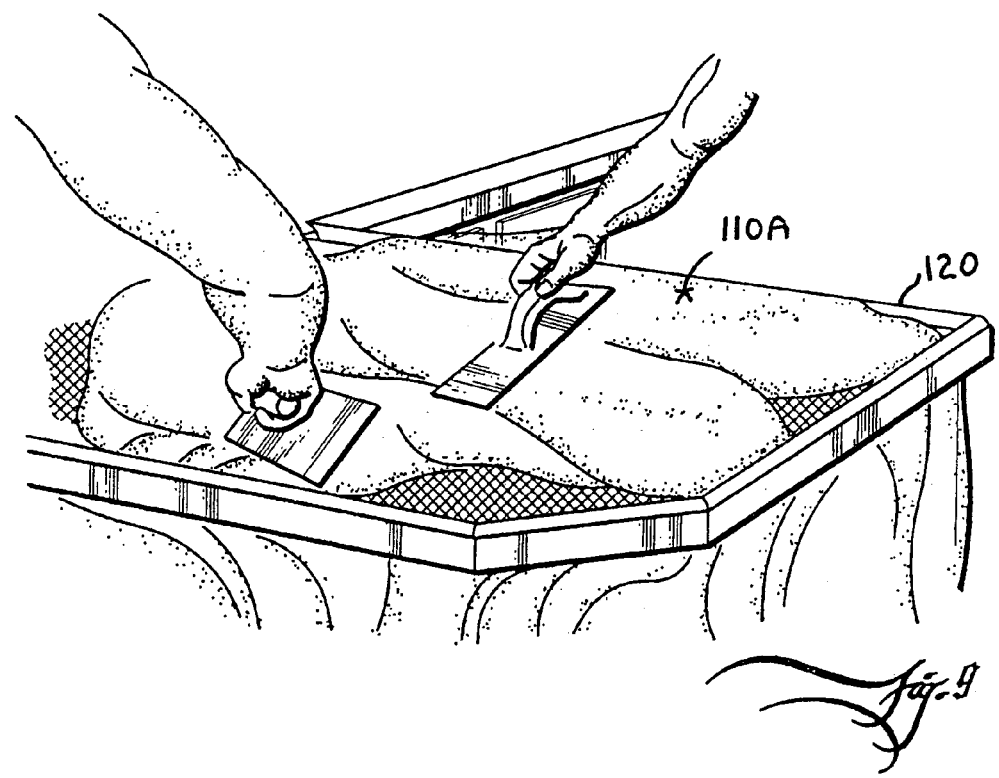

FIG. 9 shows the poured-in casting compound 110A being troweled out to completely cover up the subsisting countertop 50T to the depth set by the "rise" (see, e.g., 92 in FIG. 5) of the edging forms 120 and flow check 96 (not shown in this view), as well as descend down into and fill all profile reliefs provided by the edging forms 120.

Figure 10:
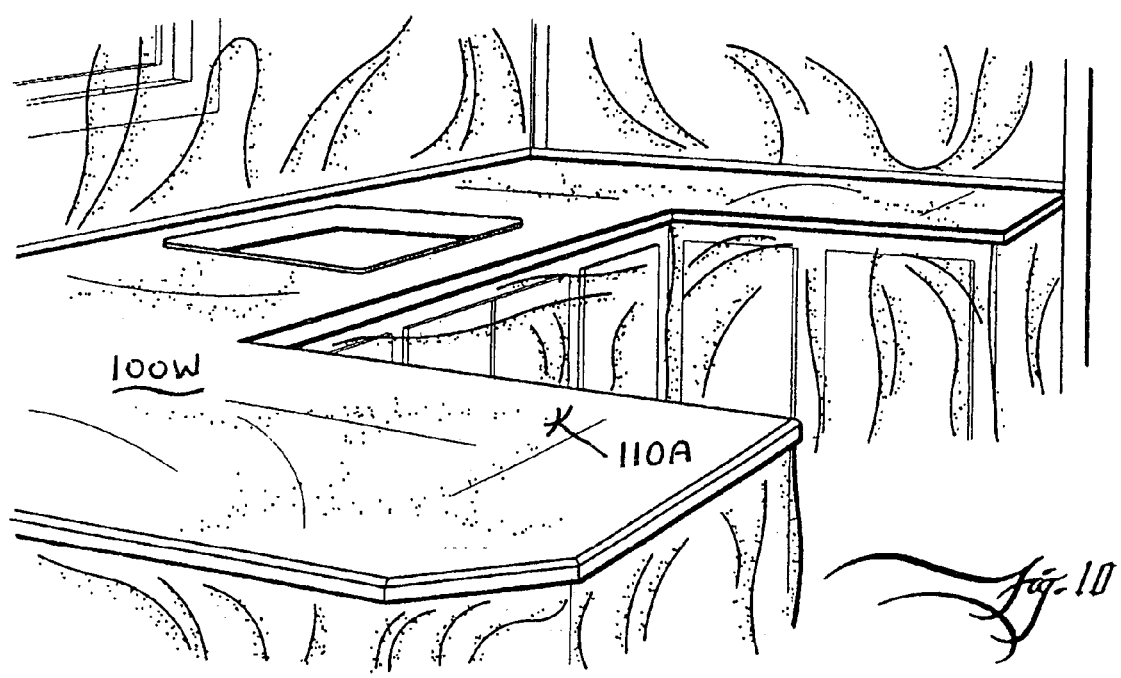

FIG. 10 shows the poured-in casting compound 110A all in place and leveled. All bubbles/voids are collapsed/filled in by tapping on a trowel or the like. To get to this point on day two generally requires about one and one-half hours (e.g., ninety minutes). Pause is taken for about an hour while the casting compound 110A is left to set and partially harden. Excluding the apron portions (e.g., fascia portions 100F in FIG. 6), the web expanses 100W of the poured-in casting compound 110A are generally only about 3/8-ths an inch thick (~10 mm).

Figure 11:
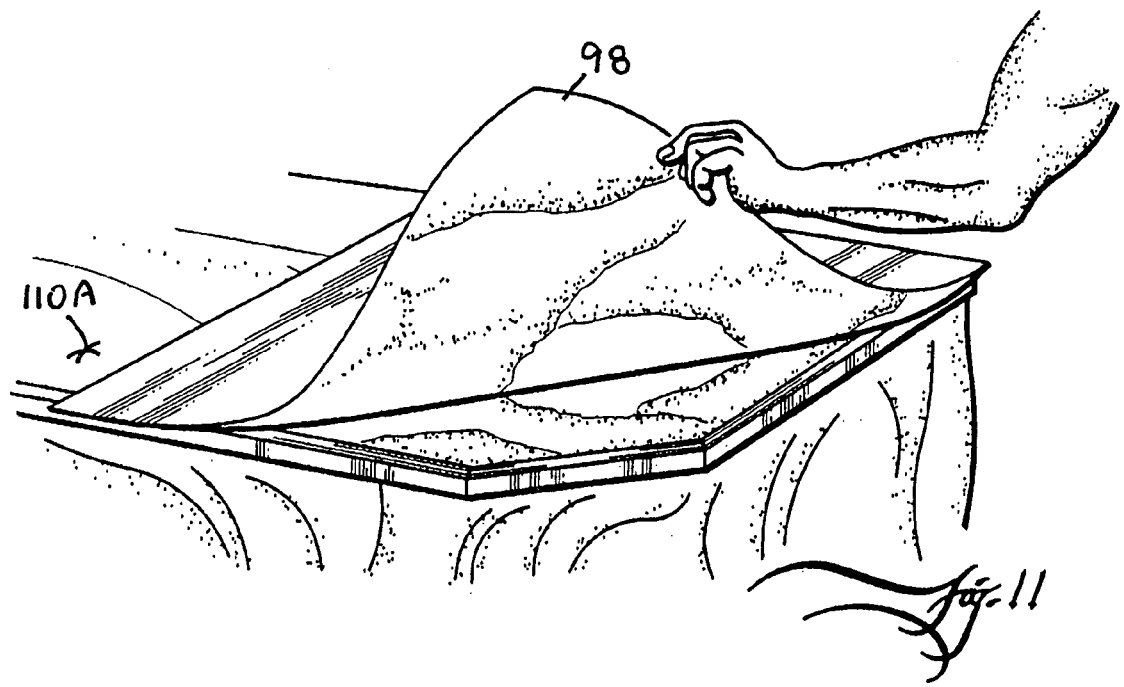

FIG. 11 shows a process for indenting a texture into the surface of the casting compound 110A. Rubber stamps 98 of the selected texture in relief are coated with a release compound. The release compound is in part a liquid release agent, various sources of which are generally the same as identified-above in connection with the polymer-modified cementitious starting materials for the casting compound, combined with in other part a colored powder. The colored powder drops off onto the tacky surface of the poured-in casting compound 110A. This is done so for antique purposes. The colored powder will darken the fault lines that get indented into the surface. Hence the rubber mats 98 are set onto the tacky surface, light pressure is preferably applied in the form of hand-patting to the extent desired to achieve the indentation of the fault lines as desired, and then removed.

Figure 12:
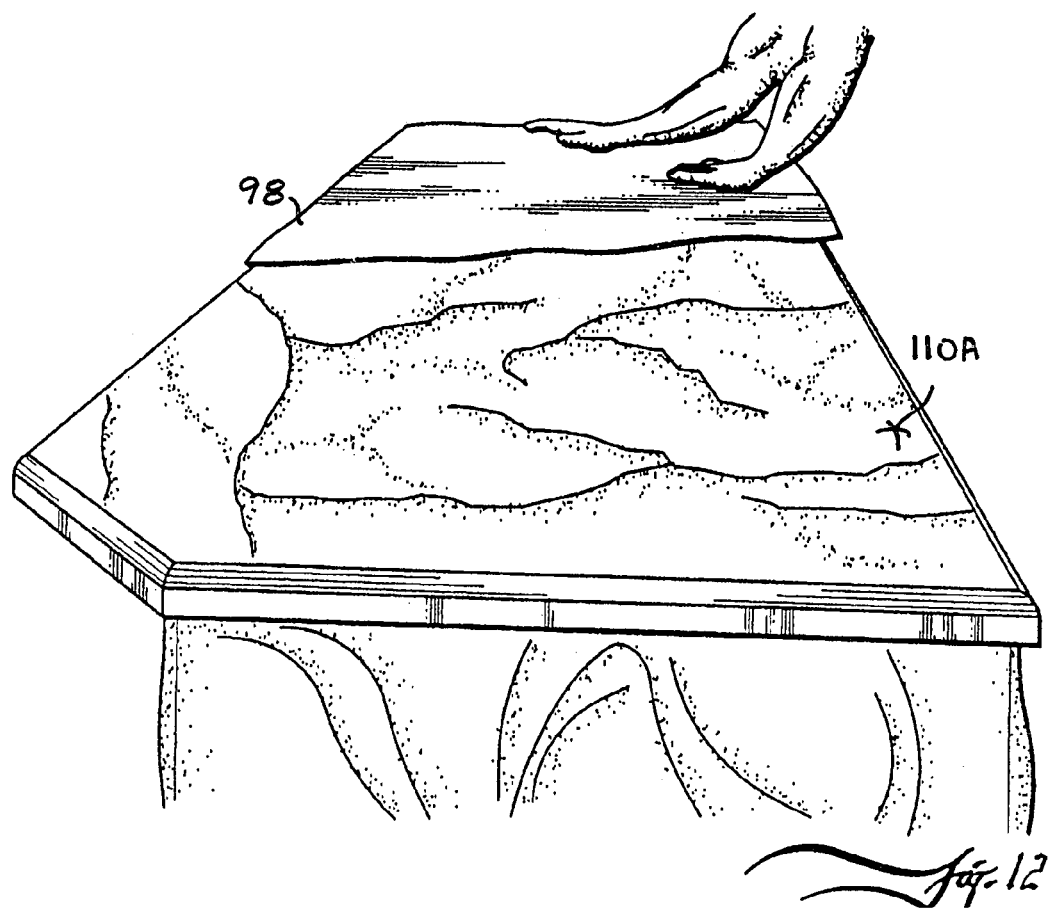

FIG. 12 shows continuation of the fault-line indenting process. The indented casting compound 110A in the foreground will as yet fail to show the results of the antique coloration. In any event, the end of this process preferably completes day two, which in comparison to day one is a short day.

Figure 13:
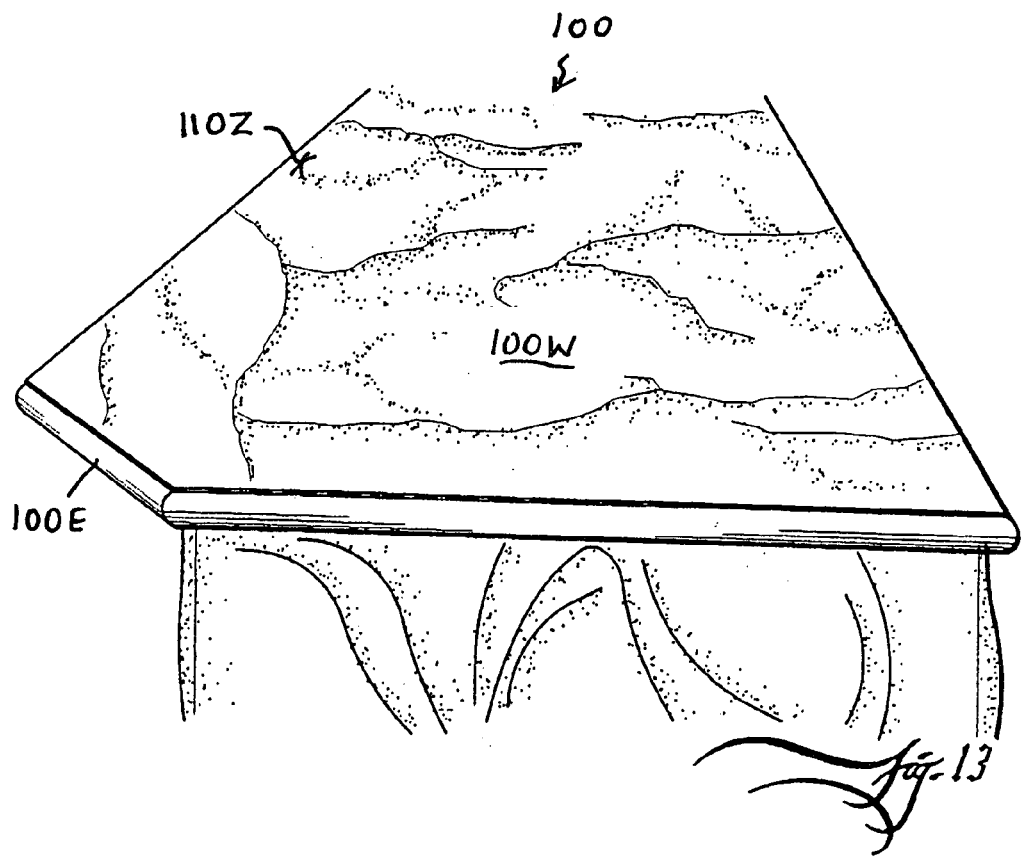

FIG. 13 shows what preferably transpires on day three. The edging forms 120 and their gutters 90, as well as the flow checks 96 (none in view) are removed this day because the polymer-modified concrete 110Z is sufficiently cured to allow this as well as what's planned for next, namely, the application of stain. At this stage, the edge profiles 100E are cleaned up of any residual foam material by light sanding with grit paper or steel wool, as well as to the flat surface expanses 100W of the countertop 100 also, although in the alternative the flat surface expanses 100W of the countertop 100 might be rubbed over by a brick or the like. This view shows completion of the step of staining the work in progress. Stain is optional. Alternatively, practitioners of the method in accordance with the invention can spray on acid and allow it to blend in. Regardless, any of these choices individually or in combination completes what is preferred for day three. It is the shortest day to date in accordance with the preferred practice of the inventive method, about a half a day. However, practitioners of the inventive method preferably leave the work dry before much more should be attempted.

Figure 14:
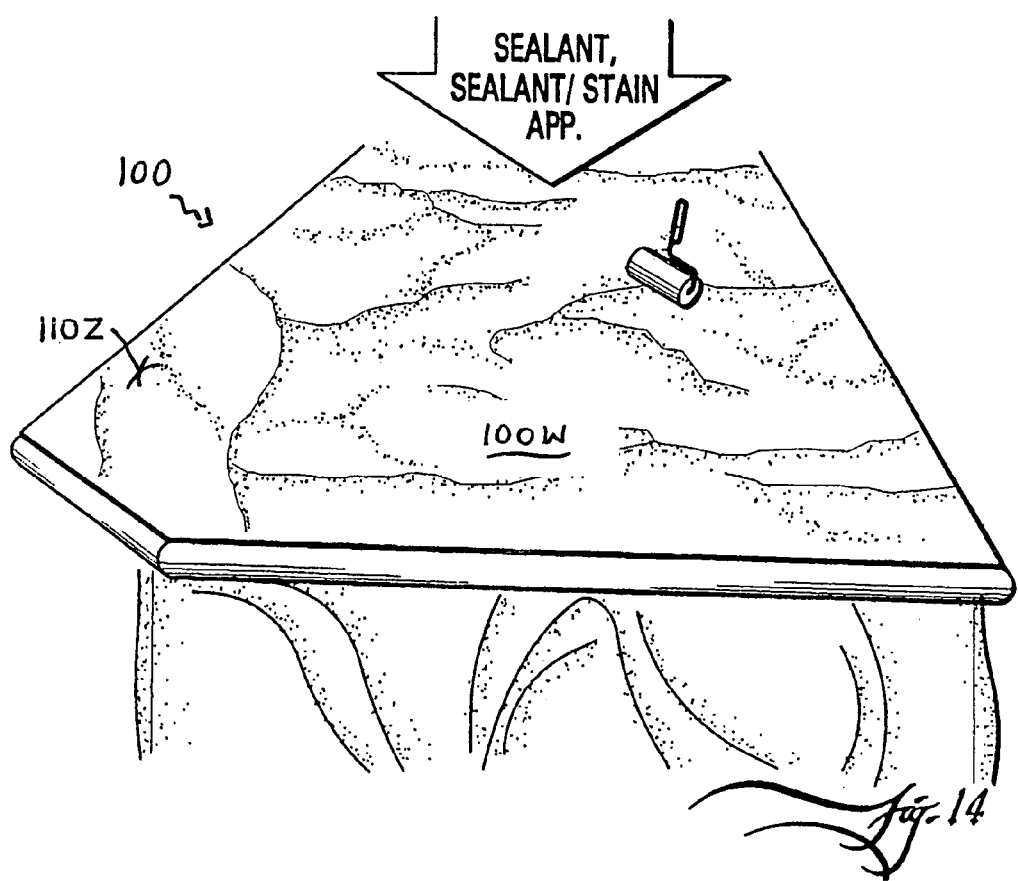

FIG. 14 shows what preferably is planned for day four, namely, application of sealant. The sealant can either be a clear coat or it can be mixed with stain as well. Hence two jobs can be accomplished by one in that the application of the sealant can concurrently accomplish application of stain. The sealant (with or without stain) is typically rolled out or spread with a paint pad. The preferred activities for day four are the shortest yet. Pause can be taken to consider why sealant can be applied after two days than twenty-eight (as required for concrete). The reasons are several. The countertop product 100 in accordance with the invention is thinner over its major web expanse 100W than comparable concrete-counter slabs from the prior art, as in, for comparison, a difference of about ⅜-ths an inch (~10 mm) to about 1½- inches (~40 mm). Also, polymer-modified concrete mixes are blended not only dry faster, but also dry twice as hard, resist better against shrinkage and hence cracking, and have flexural strength in addition.

FIG. 15 shows another view of the end of the preferred day four. The remodeling job is primarily done. The plastic film 61 cabinet protection as well as the drop cloths can be removed at this time but it is more usual to leave them on for time being. The work 100 is allowed to harden further. A customer who hires professional practitioners can be left with and entrusted to properly tear off the plastic film without the professionals having to return.

FIG. 16 is a view comparable to FIG. 1 except showing in contrast the completion of the countertop overlay 100 remodeling job. The sink 64 is re-installed and otherwise the kitchen is ready for full use. The inventive polymer-modified concrete countertop overlay has 100 been preferably textured, antiqued, stained and sealed. Some seals leave a highly shined finish, others leave a more satin (e.g., dull) finish.

Noteworthy things about the inventive method of production and product 100 are the following. The practitioners did not tear up the subsisting (e.g., original) counter 50 or countertop 50T, as both were used in the condition they were found. The enhanced countertop 100's dimension changes only slightly. It got only about ⅜-ths to about ½ inch higher (~10 to ~13 mm). The edges 100E only expanded by about ¾-ths an inch (~19 mm).

Figure 17:
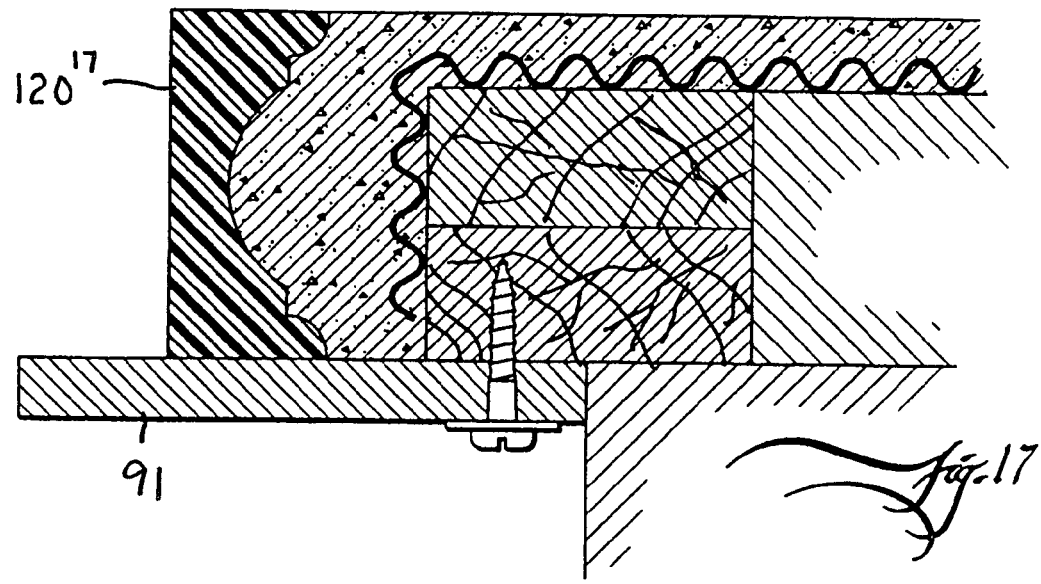
FIG. 17 is an elevational section illustration comparable to either FIGS. 5 or 6 except showing another embodiment of foam-block edging form as well as another embodiment of temporary support of the same.

FIG. 17 is an elevational section illustration comparable to either FIG. 5 or 6 except showing another embodiment of foam-block edging form 120 $^{17}$as well as another embodiment of temporary support 91 of the same.

FIG. 18 shows an alternate embodiment of a completed work $100^{19}$ in accordance with the invention except utilizing various advantages afforded by the edging-form support structure 91 of FIG. 17. Noteworthy things about this view are these. One, the resultant countertop edge $100E^{19}$ of the enhanced work $100^{19}$ is not straight but shaped with curves producing a central lobe flanked by opposite half lobes (and as shown better by FIG. 19). Remaining in FIG. 18, the curving edges $100E^{19}$ of the work $100^{19}$ are made possible by the inherent flexibility of the foam-block edging forms (e.g., $120^{17}$). That is, the foam-block edging forms 120 are deformable to assume the curve desired if the curves are sufficiently gentle. Otherwise, miter cuts will have to be made and two pieces be mated together at a miter-drawn seam. Another noteworthy thing is that the front overhang of the work's edge $100E^{19}$ is relatively substantial. Nevertheless the overhang is sufficiently strong because polymer-modified concrete mixes are stronger at supporting cantilevered overhangs than concrete alone. Indeed, polymer-modified concrete mixes generally have an inherent although moderate amount of flexural strength, in contrast to concrete, which has none.

FIG. 19 shows the counter top $100^{19}$ of FIG. 18 from a vantage point to better show the curving lines of the edges $100E^{19}$. Referencing back to FIG. 17, the wood or MDF substrate provides the real structural support for the thinnest portions of the inventive countertop product $100^{19}$. Nevertheless, polymer-modified concrete mixes are advantageous for this application in producing countertop overlays $100^{19}$ having such overhangs because the hardened material is lightweight and provides substantial flexural strength as sufficient to support the cantilevered overhangs.

FIG. 20 shows an expanse of the major flat portion of a polymer-modified concrete countertop overlay 100 in accordance with the invention embellished with not only texture and color but as well with fanciful and/or arbitrary designs 100D too.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A method of casting a concrete-mix countertop comprising the steps of:
   providing a web surface bounded in part by free edging, with edging forms that are formed with relief profiles;
   selecting selected runs of the free edging, the remainder of the free edging if any being unselected runs of the free edging;
   temporarily attaching the edging forms around the selected runs of free edging or also temporarily attaching other flow checks around the unselected runs of the free edging for the purpose of checking the flow of a casting compound to the height of a given rise over a plane of the web surface;
   wherein the relief profiles in the edging forms define depending-flange relief cavities that descend below the plane of the web surface;
   providing a concrete-mix casting compound;
   pouring the casting compound over the web surface to the level of the given rise, including filling in the cavities in the edging forms which descend below the plane of the web surface;
   removing the edging forms when the casting compound has hardened whereby the selected runs of free edging are draped over in part by a depending flange of the hardened casting compound that gives the hardened casting compound an appearance of a virtual thickness that disguises in part the actual thinness of the rise over the web surface;
   wherein the edging forms are produced of foam stock material.

2. A method of casting a concrete-mix countertop comprising the steps of:
   providing a web surface bounded in part by free edging, with edging forms that are formed with relief profiles;
   selecting selected runs of the free edging, the remainder of the free edging if any being unselected runs of the free edging;
   temporarily attaching the edging forms around the selected runs of free edging or also temporarily attaching other flow checks around the unselected runs of the free edging for the purpose of checking the flow of a casting compound to the height of a given rise over a plane of the web surface;

wherein the relief profiles in the edging forms define depending-flange relief cavities that descend below the plane of the web surface;

providing a concrete-mix casting compound;

pouring the casting compound over the web surface to the level of the given rise, including filling in the cavities in the edging forms which descend below the plane of the web surface;

removing the edging forms when the casting compound has hardened whereby the selected runs of free edging are draped over in part by a depending flange of the hardened casting compound that gives the hardened casting compound an appearance of a virtual thickness that disguises in part the actual thinness of the rise over the web surface;

before the completed pour of casting compound is hardened, stamping the surface with a texture-making stamp to create a texture.

3. A method of casting a concrete-mix countertop comprising the steps of:

providing a web surface bounded in part by free edging, with edging forms that are formed with relief profiles;

selecting selected runs of the free edging, the remainder of the free edging if any being unselected runs of the free edging;

temporarily attaching the edging forms around the selected runs of free edging or also temporarily attaching other flow checks around the unselected runs of the free edging for the purpose of checking the flow of a casting compound to the height of a given rise over a plane of the web surface;

wherein the relief profiles in the edging forms define depending-flange relief cavities that descend below the plane of the web surface;

providing a concrete-mix casting compound;

pouring the casting compound over the web surface to the level of the given rise, including filling in the cavities in the edging forms which descend below the plane of the web surface;

before the completed pour of casting compound is hardened, forming draping apron portions out of the casting compound to descend at least part way down over the selected runs of free edging;

removing the edging forms when the casting compound has hardened whereby the selected runs of free edging are draped over in part by the draping apron portions of the hardened casting compound that gives the hardened casting compound an appearance of a virtual thickness that disguises in part the actual thinness of the rise over the web surface.

4. The method of claim 3 wherein the web surface is bounded in other parts by ascending abutments including backsplashes or sidewalls.

5. The method of claim 3 further comprising, before the step of pouring, covering the web surface with a covering material comprising a lath, sheet, meshed or batt material.

6. The method of claim 3 wherein the draping apron portions form, and harden, within the cavities of the edging forms.

* * * * *